INVENTORS.
LEE E. ELFES &
BY CHARLES FRANCUCH
Tweedale & Gerhardt
ATTORNEYS.

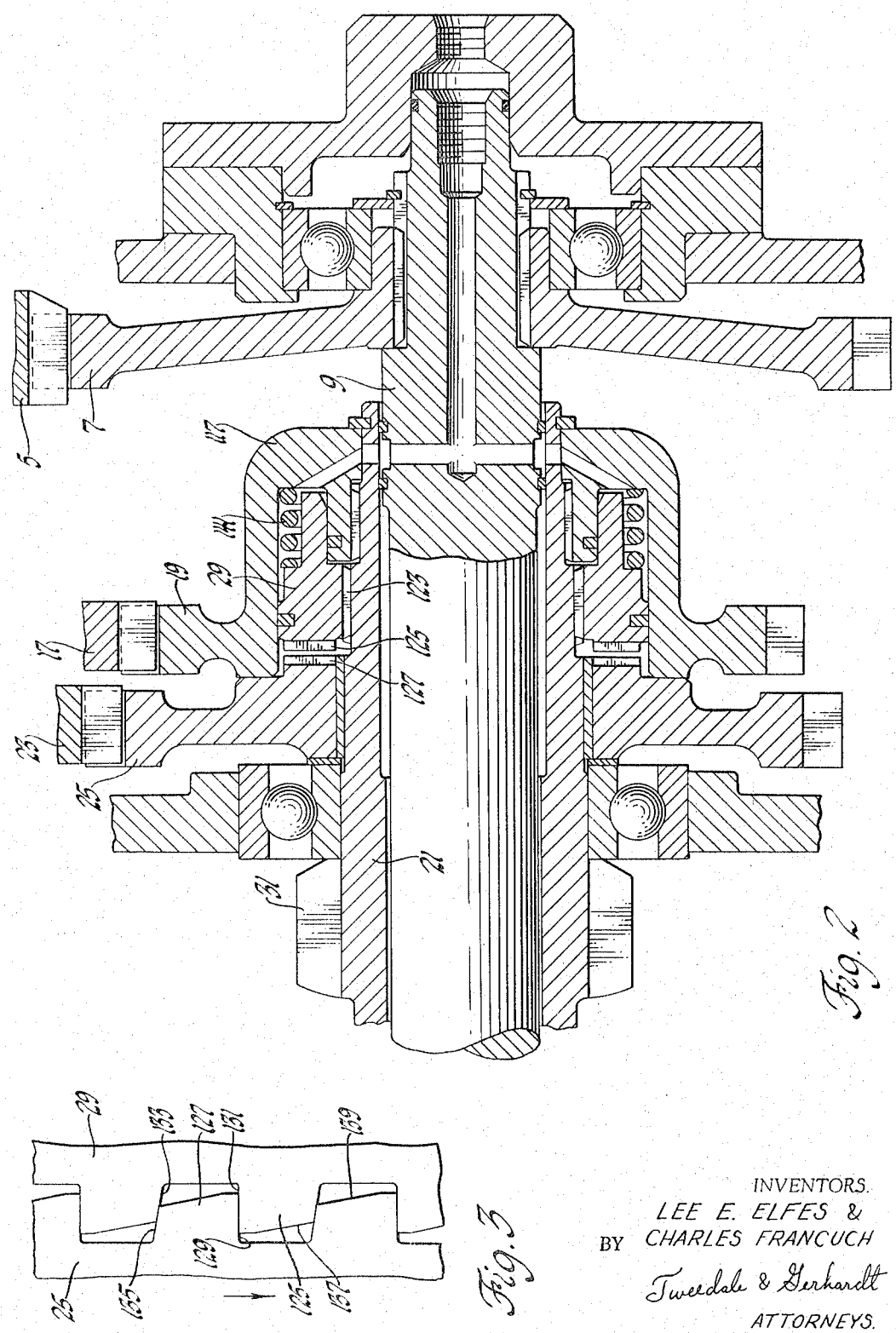

United States Patent Office 3,302,475
Patented Feb. 7, 1967

3,302,475
TRANSMISSION WITH LOCK OUT OF OVERRUN
Lee E. Elfes, Birmingham, and Charles Francuch, Royal Oak, Mich., assignors to Massey-Ferguson Inc., Detroit, Mich.
Filed Apr. 9, 1964, Ser. No. 358,477
14 Claims. (Cl. 74—368)

This invention relates to vehicle transmissions and more particularly to heavy duty vehicle transmissions of the type wherein ratio changes can be made while the vehicle is being driven.

In order to provide for the easy shifting, under torque, between speed ratios of a vehicle transmission such as that used in heavy duty vehicles, for example tractors, trucks etc., there have been developed transmissions that incorporate overrunning jaw type clutches. By using such a clutch in combination with a two-way drive clutch it has been possible to provide a transmission in which at least some of the ratio changes can be made by merely moving a valve controlling a single fluid operated element. The overrunning clutch, due to its torque directional characteristics, acts to automatically take over or release the drive through the transmission in response to the two-way drive clutch releasing or taking over the drive. By using a jaw type clutch, positive simple automatic torque or drive establishment can be obtained without the problems associated with friction bands which require a relatively large diameter and adjustment for wear as well as complex timing of the band application and release. Such a jaw clutch also eliminates the service and cost problems associated with sprag or roller type overrunning clutches.

One inherent disadvantage in using a form of overrunning clutch in a transmission drive train is the inability of the transmission to transmit torque in the reverse direction so as to take advantage of engine braking when the vehicle is coasting, particularly downhill. Either the transmission must be changed to a gear ratio which does not utilize an overrunning clutch or the vehicle brakes must be entirely relied on, resulting in additional wear and decreased total vehicle braking effect. There have been proposals to lock out the overrunning effect of the clutch to achieve the engine braking, however these proposals either require additional manual actuation by the vehicle operator, reduce the automatic torque establishment or disestablishment effect of the clutch or require complicated expensive extra components requiring additional servicing.

It is therefore an object of the invention to provide a transmission incorporating overrunning clutches that automatically will transmit torque in a reverse direction when required.

It is a further object to provide such a transmission that utilizes simple jaw type overrunning clutches that are automatically prevented from unwanted overrunning by fluid actuated means responsive to establishment of a transmission condition not requiring overrun of the clutch.

It is still a further object of the invention to provide a transmission utilizing a jaw type overrunning clutch that functions as a one-way torque transmitting device during establishment or disestablishment of drive through the clutch but functions as a two-way torque transmitting device after drive has been established through the clutch.

These and other objects and advantages will be readily apparent from the following description and accompanying drawings in which:

FIGURE 2 is a detailed cross sectional view of the transmission of FIGURE 1 showing details of the overrunning clutch and its control elements and;

FIGURE 3 is an elevational view of the cooperating teeth on the overrunning clutch of FIGURES 1 and 2.

Figure 1:
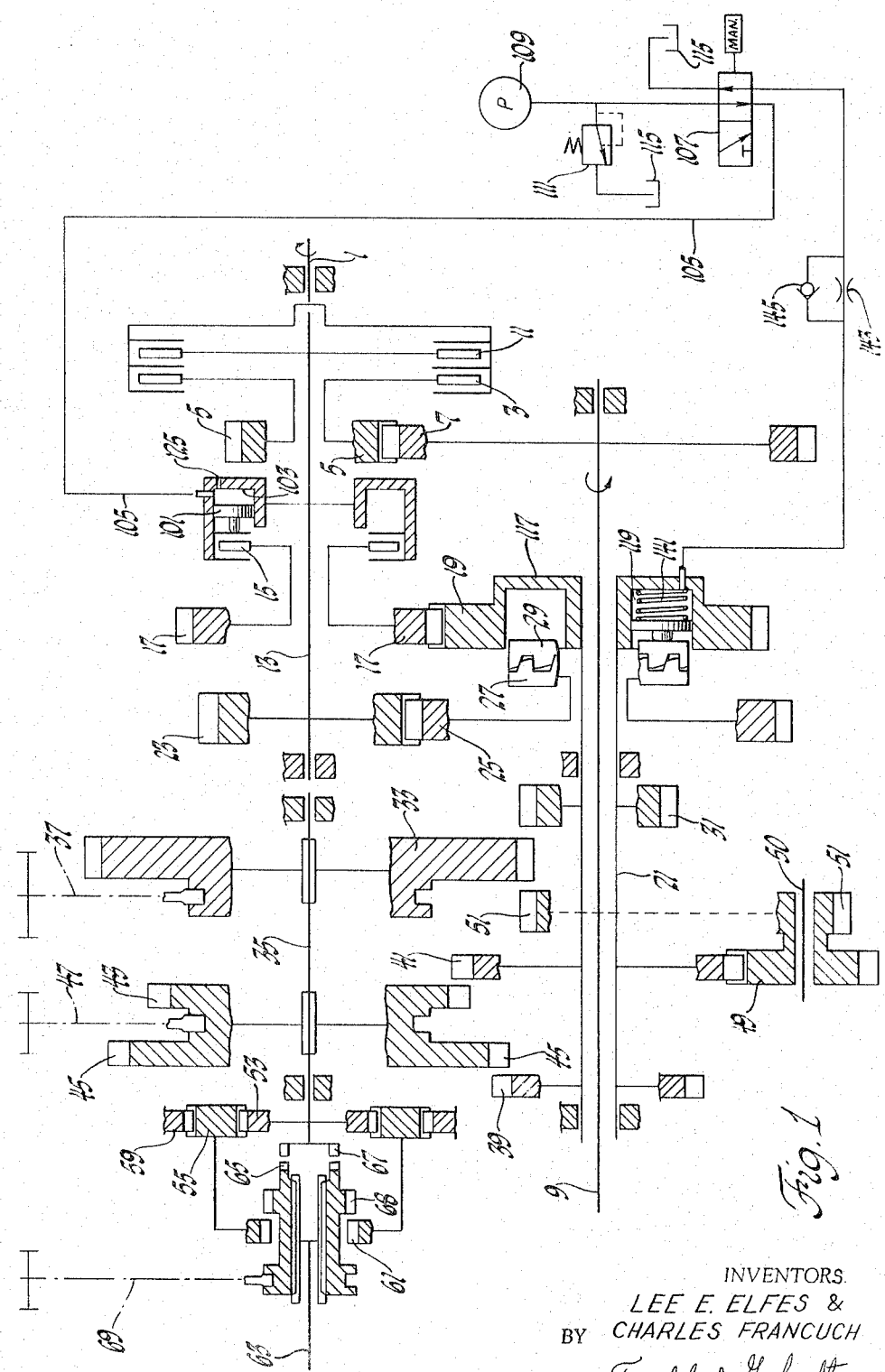
FIGURE 1 is a schematic and diagrammatic illustration of a transmission incorporating the invention.

Briefly the invention incorporates a transmission having at least one pair of different ratio gear trains connecting two shafts of the transmission. A two-way clutch, such as a fluid actuated friction clutch, is provided for establishing drive through one of the gear trains and an overrunning jaw type clutch is provided for automatically estabblishing one-way drive through the other gear train when the two-way clutch is disengaged. The teeth of the jaw clutch are constructed to separate and overrun when torque is transmitted through the two-way clutch controlled gear train. Means are provided to automatically prevent separation of the jaw teeth when the two-way clutch is disengaged, with a delayed effect of the means on the teeth as to not interfere with the normal torque establishing tooth engagement action of the clutch.

The means to prevent separation of the clutch jaws is preferably a fluid actuated means controlled by a valve which also controls the actuation and deactuation of the two-way clutch. The separation prevention delay is achieved by limiting its rate of actuation. Means are also provided for assuring that the separation preventing means does not interfere with the torque release by the one-way clutch when the drive is taken over by the two-way clutch. This last means functions by allowing rapid deactuation of the separation preventing means.

Referring to FIG. 1 which schematically illustrates a representative application of the invention, 1 is an input shaft adapted to be connected to a vehicle engine. A friction clutch 3, which may be operated by suitable means not shown, is arranged to connect the shaft 1 with a gear 5. The gear 5 meshes with a larger gear 7 secured to a countershaft 9. This shaft 9 is suitable for providing a power take off controlled by clutch 3 such as is common on tractors.

A second friction clutch 11, also operable by a suitable means not shown, is arranged to connect the input shaft 1 with an intermediate shaft 13 coaxial with the shaft 1. A friction disk type clutch 15, operable by means to be described below, is arranged to connect the shaft 13 with a gear 17 rotatably mounted on the shaft 13. The gear 17 meshes with a gear 19 secured to a hollow countershaft 21 surrounding the power-take-off shaft 9. Secured to the shaft 13 is a gear 23 of smaller diameter than the gear 17. This gear 23 meshes with a gear 25 rotatably mounted on the countershaft 21.

The gear 25 can be connected for drive of shaft 21 by means of a two piece jaw type clutch having a first member 27 operably connected to or integral with the gear 25 and a second member 29 operably connected to the shaft 21. The shaft 21 has a first speed gear 31 secured thereto. This gear is adapted to mesh with a large diameter gear 3 secured for rotation with but axially movable on shaft 35, coaxial with the shafts 13 and 1. The gear 35 can be shifted by means of a shifter fork 37 from a non-meshing position shown, into engagement with the gear 31.

Also secured to the countershaft 21 is an intermediate diameter, second speed, gear 39 as well as a large diameter, third speed, gear 41. The gears 39 and 41 can be selectively and operably connected to shaft 35 by means of a multiple diameter gear 42 member having gear portions 43 and 45. The gear member 42 is secured for rotation with shaft 35 but is axially slidably thereon by a shifter fork members 47 between the position shown to a position wherein gear 43 engages gear 41 or to a position wherein gear 45 engages gear 39.

The gear 41 is in constant mesh with a reverse idler gear 49 mounted on an idler shaft 50, which for the purposes of illustration is shown out of its actual location. The reverse idler gear 49 carries a smaller diameter gear 51 adapted to be engaged by the gear 33 when shifted by the fork 37 to the left from the position shown in FIG. 1.

Near its left hand end, the shaft 35 is connected to a sun gear 53 which meshes with a plurality of planet pinions 55 journalled on a carrier member 57. A ring gear 59 also meshes with the planet pinions 55 and is fixed to a stationary portion of the transmission. The planet carrier 57 is connected to an internally splined member 61. A sliding coupler 62 is splined on a transmission output shaft 63 and carries coupler teeth 65 adapted to engage with teeth 67 formed on the end of shaft 35. The coupler 62 also has a spline tooth portion 68 adapted to engage the internally splined member 61. A shifter fork 69 is provided to axially move the coupler member from the position shown in FIG. 1 to the right, whereby teeth 65–67 engage, or to the left whereby members 61–68 engage.

The high clutch 15 is actuated by a piston 101 formed in an annular cylinder 103 secured for rotation with the shaft 13. Fluid under pressure is supplied to the cylinder 103 through a connection 105 leading to a two position manually controlled valve 107. A pump 109 supplies pressure to the valve 107 and a regulator valve 111 acts to control the pump pressure at predetermined value. The valve 107 in the position shown in FIGURE 1 acts to connect passage 105 to the pump pressure and a passage 113 to a fluid sump 115.

The jaw clutch 27–29 and its operating piston shown diagrammatically in FIG. 1 are shown in detail in FIGS. 2 and 3. As seen in FIG. 2, the gear 19 is formed with a bell shaped hub 117 which in combination with the sleeve shaft 21, forms an annular cylinder 119. The right hand portion 29 of the jaw clutch is formed as an annular piston connected to the shaft 21 by means of helical splines 123. The member 29 has teeth 125 on the face thereof which cooperate with corresponding teeth 127 formed on the hub portion of gear 25.

As seen in FIG. 3 when gear 25 and teeth 127 are driven in the direction of the arrow and the clutch 15 is released, the surfaces 129 of the teeth 127 positively drive the surfaces 131 on the teeth 125. When the clutch 15 is engaged to drive gear 19, shaft 21 and member 29 at a faster rate than member 25, the angled faces 133 and 135 on the teeth 125 and 127, act to separate the teeth and members 25 and 29 and the teeth ride past each other on the faces 137 and 139. The helical splines 123 aid in the separation of the teeth due to the axial component of force between the member 29 and the shaft 21.

When the clutch 15 is again released, the gear 19, shaft 21 and member 29 slow down relative to member 25 until the teeth 125 and 127 are rotating at the same speed. A bias spring 141 then moves member 29 into the position shown in FIGURE 3 and the drive is again through the gears 23–25.

Referring again to FIG. 1, it will be seen that the valve 107, when moved to the right, connects the pump 109 to passage 113 whereby fluid passes through a restriction 143 to the cylinder 119. Pressure of the fluid aids the spring 141 in holding the jaw clutch engaged as shown in FIGS. 1 and 3. The restriction 143 is sized so as to allow the initial engagement of the teeth 125–127 solely by the spring 141 and allow the fluid pressure acting on the member 29 to build up after the engagement. This insures a relatively smooth engagement without a clash or noise. On the other hand once engaged, the clutch 27–29 is prevented from overrunning if the direction of drive through the transmission is reversed, such as when a vehicle embodying the illustrated transmission coasts downhill. A bypass check valve 145 in the passage 113 is provided to allow fluid to flow freely from the cylinder 119 to the valve 107 bypassing the restriction 143.

OPERATION

To start the vehicle the main drive clutch 11 is disengaged and the shifter fork members 37, 47 and 69 moved to establish the desired gear ratio in the rear portion of the transmission. The shifter forks 37 and 47, which can be operated by a conventional lever and shifter rail arrangement, set the three speed gear unit for first, second, third or reverse. For first gear the shifter 37 is moved to mesh gear 33 with gear 31 on the countershaft 21. For second gear the shifter 47 is moved to mesh gear 45 with gear 39 on the shaft 21 and for third gear moved to mesh gear 43 with gear 41 on the shaft 21. Reverse gear is obtained by moving shifter 37 to the left to mesh gear 33 with gear 51.

The planetary gear unit 53–55–59 is conditioned for high drive by shifting the fork 69 to cause engagement of teeth 65 with teeth 67 and hence directly connect the shaft 35 with the output shaft 63. The fork 69 can be operated by any suitable means, not shown. The planetary gear unit is conditioned for low drive by shifting the fork 69 to engage teeth 68 with 61 connecting the output shaft 63 with the planetary carrier 57, whereby the drive is through the sun gear 53, planet pinions 55 and carrier 57. The stationary ring gear 59 provides torque reaction for drive through the planetary unit in known manner. It will be seen that the planetary unit acts to double the three forward and one reverse speeds of the main gear unit.

The main clutch 11 can then be engaged regardless of the condition of the front two speed gear unit. Normally however, this unit would be conditioned for high drive by moving the valve 107 to the position shown in FIG. 1, whereby fluid under pressure from pump 109 is directed through passage 105 to the friction clutch cylinder 103. This acts to engage the clutch 15 and establish high drive from shaft 13 to the countershaft 21 through gears 17 and 19. While some fluid escapes through the relief port 125, this is a small amount compared to the volume provided by pump 109 and hence the pressure acting on the clutch builds up the value set by the regulator valve 111. The overrunning jaw clutch 27–29 then automatically overruns since the member 29 is driven at a faster rate than member 27 resulting in a separation of the teeth 125 and 127 against the force of the biasing spring 141.

The two ratios obtainable from the front friction clutch controlled unit act to double the total number of working speeds of the transmission. Thus the vehicle can be started in either high or low range of any of the six speeds forward or two reverse speeds and a shift under power can be made from high to low or from low to high. The gears 17, 19, 23 and 25 are dimensional so as to provide approximately a 25% increase in torque and corresponding decrease in speed when changing from high to low ratio in the two speed unit. When shifted from low back to high approximately a 30% increase in speed and corresponding decrease in torque will be obtained.

The transmission has an inherent hill holding feature. With the clutch 15 engaged and the vehicle pulling a load up a grade in either forward or reverse gear, and the main clutch 11 is disengaged, the vehicle will come to a stop and hold its position on the grade. This is due to the gears 19–17 and 25–23 attempting to drive the shaft 13 at different speeds due to the reverse drive of jaw clutch 27–29. Since this cannot occur, the shaft 21 and hence the vehicle cannot move backward. Engagement of clutch 11 will again cause the clutch 27–29 to overrun and the forward or reverse drive of the vehicle will resume.

If the vehicle should encounter conditions requiring a lower gear ratio in the transmission, such as a change in ground inclination, the operator can establish this lower ratio by merely shifting the valve 107 to the right. This acts to disconnect the pump 109 from the high clutch cylinder 103 and the pressure acting on piston 101 immediately begins to drop at a rate dependent on the flow of fluid out of the relief passage 125. If the vehicle engine is operating at a high speed, this rate will be relatively high due to the centrifugal force of the fluid in cylinder 103; whereas, if the engine speed is low, the drop in pressure will be at a lower rate.

As the clutch 15 begins to disengage, the drive of gear 17 is at a slower rate and when the speed of the gear 19 and jaw clutch member 29 is equal to that of constantly driven gear 25 and member 29, the spring 141 moves member 29 to the left with the teeth on the members taking the engaged position shown in FIGS. 1 and 3. The drive from shaft 13 to the countershaft 21 is then through the gears 23 and 25. Simultaneous with the cutoff of pressure to the high clutch cylinder, the valve 107 directs fluid from the pump 109 to the low clutch chamber 119. The restriction 143 controls the rate of flow into that chamber so that pressure on the piston does not build up until after the jaw teeth have been engaged by the spring 141. The pressure then rapidly rises to that maintained by the regulator valve 111.

In the event that the vehicle enters a coast condition resulting in a reversal of torque through the transmission, the pressure acting in chamber 119 is sufficient to prevent separation of the jaw teeth even under high instantaneous loads.

When the conditions requiring the lower gear ratio no longer exist, the operator merely shifts the valve 107 back to the position shown in FIG. 1. Fluid is again supplied to the high clutch cylinder 103 to engage the clutch 15, causing an increase in speed of the gears 17 and 19 as well as the jaw clutch member 29. Because of the shape of the teeth 125–127, and the axial spline 123, the teeth separate against the force of the spring 141. Fluid in the cylinder 19 freely escapes through the bypass valve 145 and valve 107 to the sump 115 and therefore does not interfere with the separation. The clutch 27–29 is therefore again in its overrun condition.

The power take off shaft 9 can be connected and disconnected to and from the engine at any time by operation of clutch 3. The drive is thus through the clutch 3, gears 5 and 7 and the shaft 9.

The high ratio hydraulically actuated two-way friction clutch 15 could be made in other forms such as a controlled fill and empty fluid coupling. The gear trains 17–19 and 23–25 could also comprise other forms of gearing, for example planetary gearing. Similarly the low ratio establishing jaw clutch 27–29 could be in the form of a reaction or brake device connecting a gear reaction member to a stationary portion of the transmission.

While the illustrative example shown incorporates only a single alternative, high-low clutch arrangement, including the two-way high clutch and overrunning low clutch that automatically transmits torque in both directions, this arrangement could be used in multiple fashion to obtain multiple ratio changes under torque.

Other applications, changes and modifications will be readily apparent to those skilled in the art and are deemed within the scope of the invention which is limited only by the following claims. We claim:

1. A change speed transmission including a driving shaft and a driven shaft, first gear means for transmitting drive between said shafts at one gear ratio, first drive establishing means for establishing and disestablishing two-way drive between said shafts through said first gear means, second gear means for transmitting drive between said shafts at a second gear ratio, second drive establishing means for selectively establishing and disestablishing one-way or positive two-way drive between said shafts through said second gear means, said second drive means being automatically responsive to transmit one-way drive between said shafts through said second gear means when said first drive establishing means is conditioned to disestablish drive between said shafts through said first gear means and to automatically overrun when said first drive establishing means is conditioned to establish drive between said shafts, and means for preventing said second drive establishing means from overrunning by conditioning said second drive establishing means in said positive two-way drive condition after said second drive has established said automatic one-way drive in response to said first drive establishing means being conditioned to disestablish drive.

2. The transmission of claim 1 wherein said first drive establishing means is a friction clutch and said second drive establishing means is an overrunning type jaw clutch.

3. The transmission of claim 1 wherein said second drive establishing means is an overrunning jaw clutch of the type having a pair of rotatable members having cooperating teeth that provide positive drive between the members when one member is driven faster than the other member and act to separate and hence overrun when the other member is driven faster than said one member and wherein said means for preventing said second drive establishing means from overrunning includes a fluid operated piston acting to prevent separation of asid cooperating teeth.

4. The transmission of claim 1 wherein said first drive establishing means is a fluid actuated friction clutch, and said second drive establishing means is an overrunning jaw clutch of the type having a pair of rotatable members having cooperating teeth that provide positive drive between the members when one member is driven faster than the other member and act to separate and hence overrun when the other member is driven faster than said one member, said means for preventing said second drive establishing means from overrunning including a fluid operated piston acting to prevent separation of said cooperating teeth, a source of fluid under pressure, and valve means selectively operable to connect or disconnect said source to said fluid actuated friction clutch or to said fluid operated piston.

5. The transmission of claim 4 wherein said fluid actuated friction clutch is actuated by a piston and cylinder rotatable with a driving element of said friction clutch, said cylinder connnected to said valve means and having a relief port therein allowing fluid to escape under centrifugal force at a predetermined rate dependent on the speed of said driving element when said valve means is operated to disconnect said source from said cylinder, whereby said friction clutch will disestablish drive through said one gear means at a rate dependent on the speed of said driving shaft.

6. The transmission of claim 4 wherein biasing means acts to urge said cooperating teeth together, means for delaying actuation of said fluid operated piston after said valve means has been operated to disconnect said fluid actuated friction clutch from said source so as to allow initial driving engagement of said cooperating teeth only under the force of said biasing means.

7. The transmission of claim 6 wherein said biasing means is insufficient to hold said cooperating teeth in driving engagement when said other member attempts to drive said one member, said fluid operated piston when pressurized acting to aid said biasing means in holding said cooperating teeth in driving engagement for two-way drive between said members.

8. The transmission of claim 6 wherein said valve means connects said fluid operated piston to exhaust when conditioned to connect said source to said fluid actuated friction clutch, said means for delaying actuation of said fluid operated piston comprises a restriction in the connection between said valve means and said fluid operated piston and a by-pass check valve allowing fluid to by pass said restriction when flowing from said piston to exhaust through said valve means.

9. A transmission providing a plurality of gear ratios between a driving shaft and a driven shaft, a first gear rotatably mounted on said driving shaft, a fluid operated friction clutch for connecting said first gear to said driving shaft, a second gear having a smaller diameter than said first gear mounted on said driving gear for rotation therewith, a third gear mounted on said driven shaft for rotation therewith and meshing with said first gear, a fourth gear rotatably mounted on said driven shaft and meshing with said second gear, an overrunning jaw clutch having a first portion connected to said fourth gear and a second portion connected to said driven shaft, said first and second portions having cooperating opposed teeth, means biasing said first and second portions together to provide positive drive between said fourth gear and said driven shaft through said teeth, said teeth constructed to normally separate against the force of said biasing means when said second portion is driven faster than said first portion, fluid pressure operated piston means for urging said portions together to prevent separation of said teeth, and fluid pressure control means for alternatively supplying fluid pressure to said friction clutch or said piston means whereby said driving and driven shafts are alternatively connected by said control means for two-way drive therebetween either through said second gear, fourth gear and jaw clutch or through said friction clutch, first gear and third gear.

10. The transmission of claim 9 wherein means are provided to delay actuation of said fluid operated piston upon release of said friction clutch so as to allow engagement of said teeth solely under the force of said biasing means.

11. The transmission of claim 9 wherein said piston is an annular shaped member mounted in an annular shaped cylinder formed in said third gear, said piston engaging said second portion of said jaw clutch and said biasing means acting between said piston and said third gear.

12. In a multiple speed transmission, an input shaft, an output shaft, an intermediate shaft, a two speed gear unit for connecting said input shaft with said intermediate shaft, a three speed gear unit for connecting said intermediate shaft with said output shaft, manually controllable means for establishing first, second or third gear ratio drives in said three speed unit, fluid actuated means for conditioning said two speed unit to selectively provide high or low drive of said intermediate shaft and hence provide a total of six forward gear ratios between said input and said output shafts, said fluid actuated means including a fluid pressure actuated friction clutch conditioning said two speed gear unit for high drive, a jaw type overrunning clutch for conditioning said two speed gearing for low drive, said overrunning clutch being automatically operable upon engagement of said friction clutch to overrun and automatically operable upon disengagement of said friction clutch to provide low one-way positive drive between said input shaft and said intermediate shaft during torque transmission between said input and output shafts, and fluid operated piston means for preventing overrun of said overrunning clutch after said one way drive has been established to thereby provide two-way low drive through said two speed gearing, and manually operated valve means for alternatively supplying fluid under pressure to said friction clutch and said piston means, said high and low ratios of said two speed unit being spaced closer together than said first, second and third gear ratio drives.

13. The transmission of claim 12 wherein said three speed gear unit also provides a reverse gear drive ratio so that said high and low ratios of said two speed unit provide two overall reverse gear ratios as well as the six forward gear ratios.

14. A change speed transmission including a driving shaft and a driven shaft, first gear means for transmitting drive between said shafts at one gear ratio, first drive establishing means for establishing and disestablishing two-way drive between said shafts through said first gear means, second gear means for transmitting drive between said shafts at a second gear ratio, second drive establishing means for establishing and disestablishing one-way drive between said shafts through said second gear means, said second drive means including engageable and disengageable positive driving and driven elements and being automatically responsive to transmit one-way drive through said driving and driven elements between said shafts through said second gear means when said first drive establishing means is conditioned to disestablish drive between said shafts through said first gear means and to automatically overrun by disengagement of said driving and driven elements when said first drive establishing means is conditioned to establish drive between said shafts, and means for preventing disengagement of said driving and driven elements of said second drive establishing means after it has established said automatic one-way drive in response to said first drive establishing means being conditioned to disestablish drive.

References Cited by the Examiner
UNITED STATES PATENTS

| | | | |
|---|---|---|---|
| 2,375,783 | 5/1945 | Gilfillan | 74—368 |
| 3,138,965 | 6/1964 | Stockton | 74—330 |
| 3,187,598 | 6/1965 | Hennessey et al. | 74—368 |

DAVID J. WILLIAMOWSKY, *Primary Examiner.*

H. S. LAYTON, *Assistant Examiner.*